Patented Dec. 20, 1949

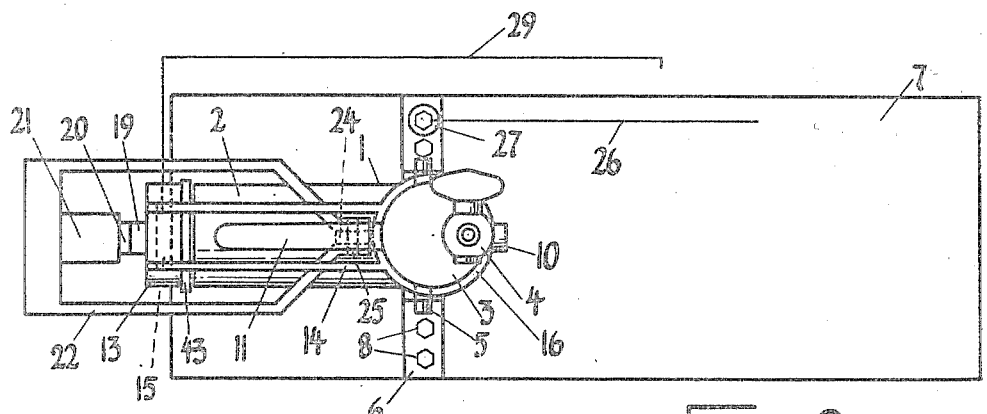
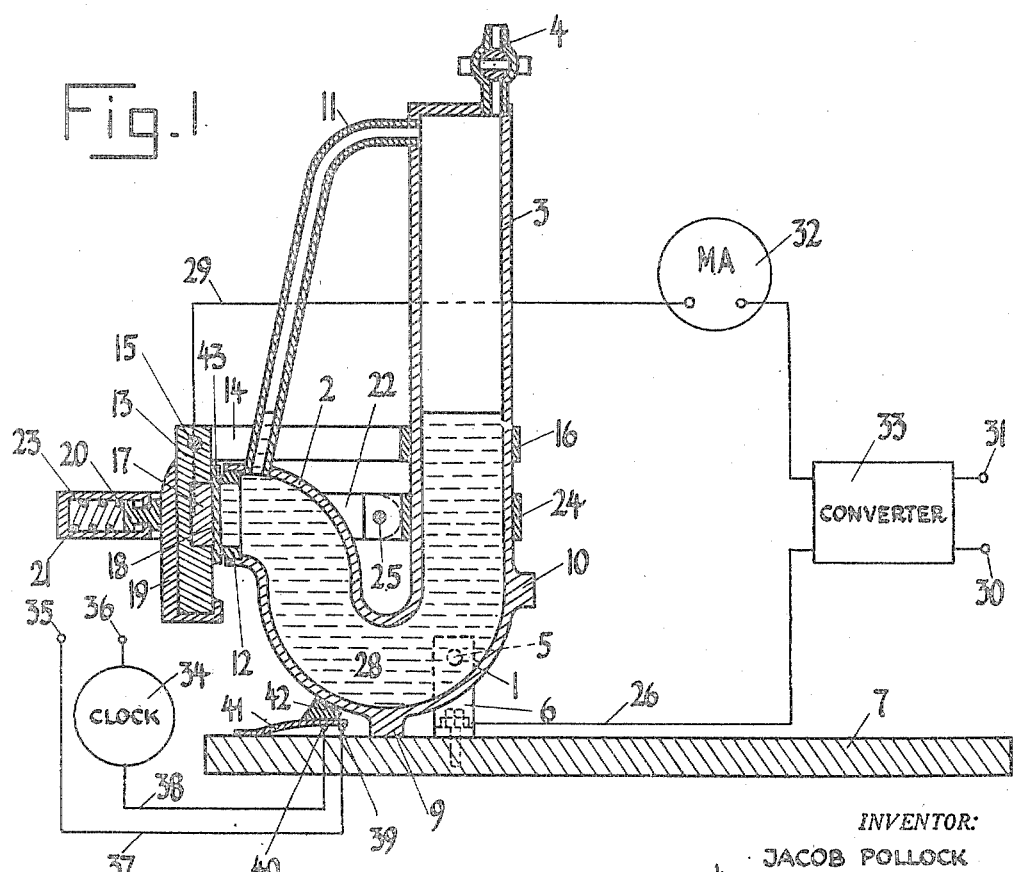

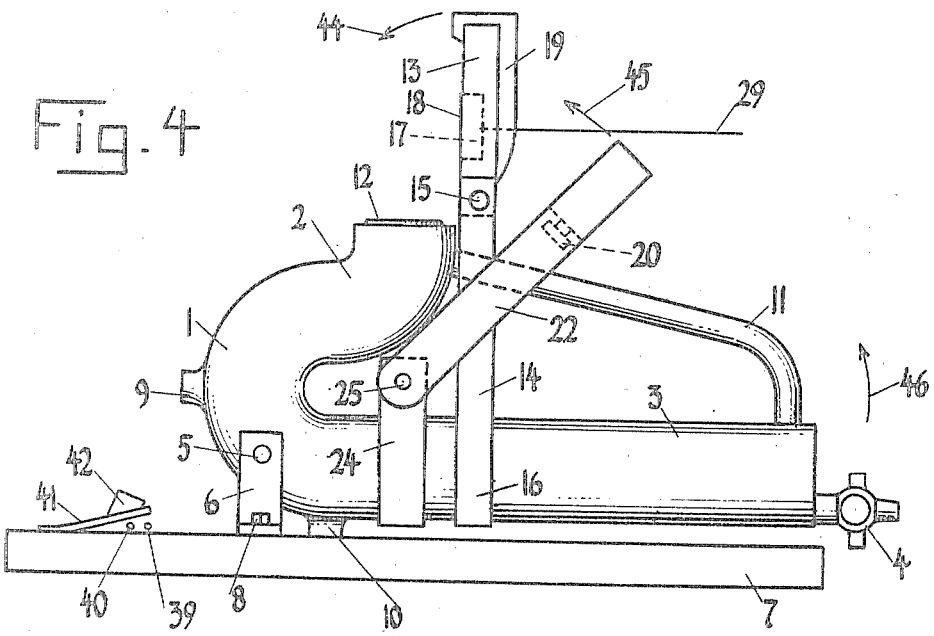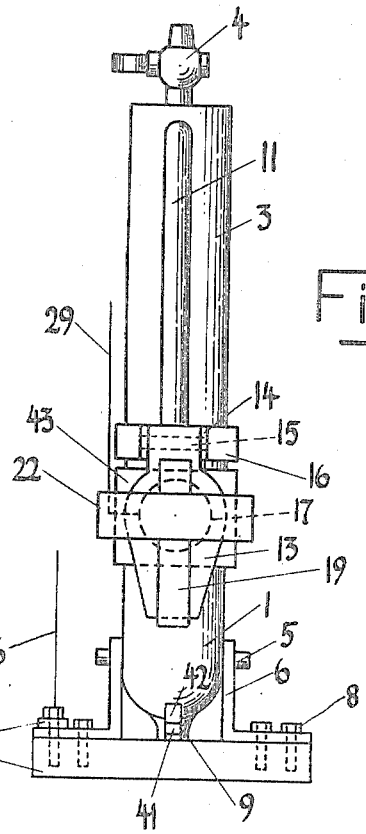

2,491,689

UNITED STATES PATENT OFFICE 2,491,689

MOISTURE TESTER

Jacob Pollock, Kew Gardens, N. Y., assignor to Jacob Pollock and Adolph Warsher, doing business as General Fibre Products Co., Maspeth, N. Y., a firm Application May 9, 1945, Serial No. 592,743

16 Claims. (Cl. 175—183)

My invention relates to the testing of the moisture of cardboard or similar fibrous or porous materials, and, more particularly, to tests determining or measuring the degree in which moisture can enter or penetrate such material.

Hitherto such tests have been carried out by cumbersome methods requiring much time, for example, by suspending a sample of the material to be tested in a chamber filled with air of 100 per cent humidity, and measuring the increase of weight which the sample shows after 24 hours, such a long time being necessary in order to obtain an accurately measurable difference of weight. Objects of my invention are to reduce the time for accurate tests of this kind, to avoid the necessity of using a bulky chamber and a humidity or steam producing device, and to reduce the expenses of the tests.

Another object is to measure the moisture of a material continuously while the moisture gradually permeates the material whereby the moisture receiving quality of the material is more thoroughly determined, and, in addition, the test can be interrupted as soon as the result is sufficiently accurate to discriminate between moisture-proof and faulty material.

A further object is to obtain highly accurate results by electric measurement.

Still other objects and advantages will appear from the following description of an exemplifying embodiment of an inventive device and of its operation, from the appended claims, and from the accompanying drawings in which:

Fig. 1 shows a vertical central cross-section of an illustrative embodiment of my invention in operating condition, some parts belonging to electric circuits shown diagrammatically.

Fig. 2 shows a view of the same embodiment seen from above, parts of the electric circuit being omitted.

Fig. 3 shows a view of the same embodiment seen from the left side in Fig. 1, parts of the electric circuits being omitted.

Fig. 4 shows a view of the same embodiment seen in the same direction as Fig. 1 and represented in a condition adapted for preparation of the operation, parts of the electric circuit being omitted.

Referring to the drawings, numeral 1 indicates a metallic receptacle of preferably tubular and bent shape. The bent part of the tube 1 connects a shorter arm 2 having an open end with a longer arm 3 having a closed end provided with a tap 4.

The receptacle 1 is turnable around a horizontal axis. For example, two co-axial shafts 5 are affixed to the wall of the tube 1 and are rotatable in bores of brackets 6 which may be mounted on a wooden base plate 7 by means of screws 8. The tube is adapted to rest on the plate 7 in either of the two positions shown in Figs. 1 and 4 respectively. These two positions are turned relatively to each other preferably about an angle of about ninety degrees. For example, the tube is provided with a projection 9 which contacts the plate 7 in the position shown in Figs. 1, 2 and 3, and with a projection 10 which contacts the plate in the position shown in Fig. 4.

A pipe 11 connects that part of the inner space of the tube arm 2 which is highest in the position of operation shown in Figs. 1, 2 and 3 with the inner space near the end of the tube arm 3. The ends of the pipe 11 are permanently and tightly connected to the tube 1.

The opening of the tube arm 2 is preferably located horizontally in the position shown in Fig. 4 and vertically in the operating position shown in Figs. 1, 2 and 3. This opening may be armed with a ring 12 inserted in the mouth of the tube arm 2 and having a narrow rim slightly projecting over this mouth. A cover 13 made of electrically insulating material is adapted to be pressed toward this mouth or toward this rim and is hinged to a forked member 14, for example, by a pin 15 passing through co-axial bores in the cover 13 and in the member 14. At the other end, the forked member 14 terminates in a ring 16 affixed to the tube arm 3.

A conductive electrode 17 preferably made of copper is so inserted in the cover 13 that the cover insulates the electrode at all sides except at a surface 18 which in the closed position of the cover shown in Figs. 1, 2 and 3 faces the opening of the ring 12. Preferably, this opening and this surface have the same, accurately measured area and exactly facing circumferences. The cover 13 may be armed or reinforced by a metal piece 19 covering the median part of the cover's outer surface and gradually sloping in the direction to the hinge 15.

The piece 19 is adapted to transmit pressure from a piston or stamper 20 to the cover 13. The piston 20 is guided in a housing or cylinder 21 connected to two lateral arms 22. A strong spring 23 is positioned in the housing 21 and urges the piston 20 outwardly. The arms 22 are hinged to a member 24, the hinge being formed by a pin 25 passing through co-axial bores in the arms 22 and in the member 24. This member is affixed to the tube arm 3 in similar manner as the member 14.

A conductive wire 26 is affixed, for example soldered to a washer 27 placed under the head of one of the screws holding one of brackets 6, whereby the wire 26 is electrically connected through a bracket 6, a pin 5 and the wall of the tube 1 to a conductive liquid 28 contained in the tube 1. Another wire 29 passes through the insulating material of the cover 13 and is connected to the electrode 17. The wire 26 is connected to a pole 30 of an electric current source, and the wire 29 is connected to the other pole 31 of this source. An electric measuring instrument 32, preferably a milli-amperemeter, is inserted in the circuit comprising the wires 26 and 29. A converter 33 may be also inserted in this circuit in known manner. The converter 33 serves to transform alternating current into direct current if the poles 30 and 31 supply alternating current. In addition, the converter may serve to transform the voltage of the poles 30 and 31 into a voltage adapted for the operation of the invention, a voltage of about 350 volts being, for example, produced by the converter.

The device may be provided with time measuring means which start automatically when the tube 1 is turned from the position shown in Fig. 4 into the position shown in Figs. 1, 2 and 3. The time measuring device may comprise an electric clock 34 supplied with current from two poles 35 and 36 over wires 37 and 38 which are open or disconnected between contacts 39 and 40 when the tube 1 is in the position shown in Fig. 4. When the tube 1 is turned into the position shown in Fig. 1, the tube depresses the free end of a flat spring 41 which, in the depressed position, connects the contacts 39 and 40 whereby the circuit operating the clock 34 is closed. Preferably the tube 1 does not contact the spring 41 immediately but presses on a block 42 made of insulating material and affixed to the movable end of the spring. The other end of the spring 41 is affixed to the plate 7 in any suitable manner.

In order to prepare the operation of the described device, the tube 1 is turned around the axis of the shafts 5 in clockwise direction (Fig. 1) until the projection 10 comes to rest on the base plate 7 (Fig. 4). The arms 22 are turned in the same direction still farther whereby the outer surface of the piston 20 at first slides along the sloping surface of the piece 19 and, then, loses contact with this piece. The arms are turned sufficiently far for allowing to open the cover 13, for example as far as shown in Fig. 4. Then, the cover 13 is turned around the hinge pin 15 whereby the opening of the tube arm 2 is uncovered. The Fig. 4 shows the parts of the device in the now reached positions. The tap 4 is closed.

An electrically conductive liquid 28 is filled through the opening of the tube arm 2 into the tube or receptacle 1. Any kind of conductive liquid or electrolyte which does not harm the material of the tube or dissolve the material to be tested may be used. Preferably, I use a solution of 50 grams aspirin in a quart of water, and I have found that this solution has a constant and suitably strong conductivity and does not interfere chemically with the metal of the tube or with the tested materials. In all tests, preferably the same standardized quantity of conductive solution 28 is used. This quantity is preferably considerably smaller than the inner space of the tube 1 whereby, in the position of the tube shown in Fig. 4, the liquid has a surface level below the filling opening. But this quantity is large enough to fill the tube up to a level higher than the highest point of the opening of the tube arm 2 when this opening has been lowered relatively to the arm 3 by turning the tube into the position shown in Fig. 4.

A sample of the material to be tested is taken in the form of a thin, flat sheet 43 having an area somewhat larger than the opening of the ring 12. This sheet (not shown in Fig. 4) is placed over this opening which is thereby completely covered. Then, the cover 13 is turned in the direction of the arrow 44 around the pin 15 whereby the surface 18 of the electrode 17 contacts the sheet 43. The arms 22 are turned around the pin 25 in the direction of the arrow 45 until the piston 20, after sliding along the sloping surface of the piece 19, is positioned co-axially with the opening of the ring 12. In this position, this opening is tightly sealed by the sheet 43 which is pressed by the cover 13 against the edge of this opening, the cover 13 being pressed, in turn, by the piston 20 under the pressure of the spring 23.

With the sheet 43, the cover 13 and the piston 20 in the last described conditions, the tube 1 is turned around the axis of the shafts 5 in the direction of the arrow 46 until the projection 9 comes to rest on the plate 7 whereby the device reaches the condition shown in Figs. 1, 2 and 3. In this condition, the liquid 28 has a surface level higher than the highest point of the tube arm 2, the pipe 11 releasing the air which was contained in the upper part of this arm into the elevated end of the tube arm 3. If necessary, any excessive air pressure in the tube may be released by opening the tap 4. This tap may also serve to empty the tube 1 after the operation is finished and the tube has been returned into the position shown in Fig. 4.

In the position shown in Fig. 1, the liquid 28 contacts the sheet 43 at a surface positioned opposite to the surface 18 of the electrode 17. The liquid may be regarded as a second electrode. The sheet 43 insulates this liquid electrode from the electrode 17 whereby the circuit connecting these electrodes with the poles 30 and 31 is interrupted and no current exists in this circuit as the milli-amperemeter 32 will indicate.

When liquid penetrates the sheet 43, this sheet becomes conductive in a smaller or larger degree depending on the amount of conductive liquid entering the material of the sheet. With gradually increasing penetration, the electric resistance of the sheet decreases gradually whereby a gradually increasing current will flow between the electrodes 17 and 28 and will be indicated by the milli-amperemeter 32. This indication, in connection with the time passed since the beginning of the liquid contact, measures the moisture permeability of the sheet.

This time may be read from any watch or clock, the first reading being made when the tube is turned into the position shown in Figs. 1, 2 and 3. Or, the time may be indicated by a clock which starts running when the tube is turned. For example, the operation of the electric clock 34 starts obviously simultaneously with the beginning of the liquid contact.

I desire it understood that my invention is not confined to the embodiment shown and described, the same being merely illustrative, and that the invention may be carried out in other ways without departing from the spirit of my invention as it is obvious that the embodiment shown and described is only one of the many that may be employed to atain the objects of my invention.

Having described the nature of my invention, what I claim and desire to secure by Letters Patent is:

1. A device for testing the moisture premeability of a material, said device comprising a tubular receptacle, said receptacle comprising a long arm and a short arm offset from said long arm, said short arm having an opening, a closure member pivotally secured to said receptacle and adapted to cover said opening, a clamp member pivotally connected to said receptacle and adapted to press said closure member against said opening, a plate electrode secured to the inner face of said closure member, said electrode having an area equal to the area of said opening, and said receptacle being adapted to contain a conductive liquid.

2. A device for testing the moisture premeability of a material, said device comprising a tubular receptacle, said receptacle comprising a long arm and a short arm offset from said long arm, said short arm having an opening, a closure member pivotally secured to said receptacle and adapted to cover said opening, a clamp member pivotally connected to said receptacle and adapted to press said closure member against said opening, a plate electrode secured to the inner face of said closure member, said electrode having an area equal to the area of said opening, said receptacle being adapted to contain a conductive liquid, means to mount said receptacle for rotation, and means to limit movement of said receptacle to positions wherein the long arm of said receptacle is vertical or horizontal.

3. In a device for testing the moisture premeability of material, the combination of a base member and a tubular receptacle rotatably mounted on said base member, said receptacle comprising a long arm and a short arm extending to one side of said long arm, said short arm having an opening, a closure member for said opening, said closure member having an electrode on the surface facing said opening, said receptacle being adapted to contain a conductive liquid, an electrically operated indicating device connected in circuit with said electrode and said conductive liquid, a source of current in said circuit, an electrically operated timing device connected in circuit with switch means, said switch means being mounted on said base member, said switch means being adapted to be actuated by contact with said receptacle when said receptacle is pivoted into an operative position.

4. A device for testing the moisture permeability of a material, said device comprising a tubular receptacle, said receptacle comprising a long arm and a short arm offset from said long arm, said short arm having an opening, a closure member pivotally secured to said receptacle and adapted to cover said opening, a clamp member pivotally connected to said receptacle and adapted to press said closure member against said opening, a plate electrode secured to the inner face of said closure member, said electrode having an area equal to the area of said opening, said receptacle being adapted to contain a conductive liquid, means to mount said receptacle for rotation, means to limit movement of said receptacle to positions wherein the long arm of said receptacle is vertical or horizontal, a valved means on said long arm, said valved means serving as a drain for liquid from said receptacle when the long arm is horizontal, and to vent trapped air when said long arm is vertical.

5. In a device for testing the moisture, permeability of a material, said device comprising a base, a tubular receptacle adapted to contain a conductive liquid rotatably mounted on said base, said receptacle comprising a V-shaped member having a long and a short arm, said short arm having an opening, a closure member for said opening in said short arm, a plate electrode secured to an inner surface of said closure member and adapted to face the opening in said receptacle, and pressure applying means adapted to press said closure member against the opening in said short arm.

6. In a device for testing the moisture permeability of a material, said device comprising a base, a tubular receptacle adapted to contain a conductive liquid rotatably mounted on said base, said receptacle comprising a V-shaped member having a long and a short arm, said short arm having an opening, a closure member for said opening in said short arm, a plate electrode secured to an inner surface of said closure member and adapted to face the opening in said receptacle, pressure applying means adapted to press said closure member against the opening in said short arm, switch means mounted on said base member, said switch means being adapted to be actuated by contact with said receptacle when said receptacle is in an operative position.

7. In a device for testing the moisture permeability of a material, said device comprising a base, a tubular receptacle adapted to contain a conductive liquid rotatably mounted on said base, said receptacle comprising a V-shaped member having a long and a short arm, said short arm having an opening, a closure member for said opening in said short arm, a plate electrode secured to an inner surface of said closure member and adapted to face the opening in said receptacle, pressure applying means adapted to press said closure member against the opening in said short arm, said pressure applying means comprising a member pivotally connected to said receptacle, said pivotally connected member including a spring-pressed member, said pivotally connected member being adapted to swing into operative position whereby said spring pressed member slidably engages the rear portion of said closure member upon swinging said pivotally connected member into operative position to resiliently press said closure member against the opening in said short arm.

8. A device for testing moisture permeability of material, said device comprising a receptacle adapted to contain an electrolyte, and formed with an opening whereby material to be tested may be placed in overlying relation relative to said opening, an electrode adapted to contact the material overlying said opening, means to clamp said electrode to said receptacle for pressing said material against said receptacle, and a valved vent on said receptacle remote from said opening.

9. In combination, a movably mounted receptacle adapted to contain an electrolyte, said receptacle having an opening, means to affix a sample of material to be tested for moisture permeability at the opening of said receptacle, an electrically operated clock, a circuit for said clock, including a normally open switch, and means controlled by movement of said receptacle to close said switch.

10. A device for testing moisture permeability of a material including a receptacle adapted to contain electrolyte, and formed with an opening, means to clamp a sample of material to be tested at the opening of said receptacle, means to mount said receptacle for movement, means to retain said receptacle in an inoperative position with the electrolyte out of contact with the sample at the opening, and in a second operative position with the electrolyte in contact with said opening, an electric clock, a circuit for said clock, said circuit being normally open when said receptacle is in its inoperative position, and means controlled by movement of said receptacle from inoperative to operative position for closing the circuit to said clock.

11. A device for testing moisture permeability of a material including a receptacle adapted to contain electrolyte, and formed with an opening, means to clamp a sample of material to be tested at the opening of said receptacle, means to mount said receptacle for movement, means to retain said receptacle in an inoperative position with the electrolyte out of contact with the sample at the opening, and in a second operative position with the electrolyte in contact with said opening, an electric clock, a circuit for said clock, said circuit being normally open when said receptacle is in its inoperative position, means controlled by movement of said receptacle from inoperative to operative position for closing the circuit to said clock, a valved outlet on said receptacle remote from said opening, said valved outlet serving as a drain in the inoperative position of said receptacle, and as a vent in the operative position of said receptacle.

12. A device for testing moisture permeability of material, comprising a base, a receptacle pivoted to the base, said receptacle having an opening, an electrode pivoted relative to the receptacle and adapted to be moved in overlying position relative to the opening in said receptacle, and a clamp pivoted relative to the receptacle and adapted to press said electrode against the receptacle at its opening.

13. A device for testing moisture permeability of material, comprising a base, a receptacle pivoted to the base, said receptacle having an opening, an electrode pivoted relative to the receptacle and adapted to be moved in overlying position relative to the opening in said receptacle, and a clamp pivoted relative to the receptacle and adapted to press said electrode against the receptacle at its opening, the pivotal axes for the electrode and clamp being parallel and spaced from one another.

14. A device for testing moisture permeability of material, comprising a base, a receptacle pivoted to the base, said receptacle having an opening, an electrode pivoted relative to the receptacle and adapted to be moved in overlying position relative to the opening in said receptacle, a clamp pivoted relative to the receptacle and adapted to press said electrode against the receptacle at its opening, the pivotal axes for the electrode and clamp being parallel and spaced from one another, said clamp including a spring pressed member engaging the electrode, and said electrode having cam means engaged by said spring pressed member to facilitate engagement of said clamp means relative to said electrode.

15. A device for testing moisture permeability of material, comprising a base, a receptacle pivoted to the base, said receptacle having an opening, an electrode pivoted relative to the receptacle and adapted to be moved in overlying position relative to the opening in said receptacle, a clamp pivoted relative to the receptacle and adapted to press said electrode against the receptacle at its opening, the pivotal axes for the electrode and clamp being parallel and spaced from one another, said clamp including a spring pressed member engaging the electrode, and said electrode having cam means engaged by said spring pressed member to facilitate engagement of said clamp means relative to said electrode, and means to limit rotation of said receptacle to 90° and for retaining said receptacle in either of its limiting positions.

16. A device for testing permeability of a sample of material, comprising a receptacle adapted to contain conductive liquid, means to mount said receptacle for rotation, means to limit rotation of said receptacle to 90°, said receptacle having an opening adapted to face upward in one position of said receptacle and adapted to face otherwise than upward in another position of said receptacle, means on the receptacle to clamp a sample of material to be tested to said receptacle at said opening so that said liquid will not contact said sample in the first-mentioned position of said receptacle, but will contact said sample when said receptacle is moved out of its first position.

JACOB POLLOCK.

REFERENCES CITED

The following references are of record in the file of this patent:

UNITED STATES PATENTS

| Number | Name | Date |
| --- | --- | --- |
| 1,391,041 | Boon et al. | Sept. 20, 1921 |
| 1,545,186 | Henriksen et al. | July 7, 1925 |
| 1,922,792 | Cain | Aug. 15, 1933 |
| 1,953,155 | Currier | Apr. 3, 1934 |
| 2,012,762 | Kern | Aug. 27, 1935 |
| 2,047,638 | Kott | July 14, 1936 |
| 2,082,364 | Store | June 1, 1937 |

FOREIGN PATENTS

| Number | Country | Date |
| --- | --- | --- |
| 486,856 | Great Britain | June 7, 1938 |